Oct. 26, 1965    D. D. STARK    3,214,059
TISSUE DISPENSER
Filed Aug. 21, 1963

INVENTOR.
DARREL D. STARK
BY Dugger Braddock Johnson + Westman
ATTORNEYS

United States Patent Office 3,214,059
Patented Oct. 26, 1965

3,214,059
TISSUE DISPENSER
Darrel D. Stark, 3005 Colorado Ave. S.,
Minneapolis, Minn.
Filed Aug. 21, 1963, Ser. No. 303,610
6 Claims. (Cl. 221—46)

This invention relates to a facial tissue dispenser, and more particularly to a simple and inexpensive dispenser designed to fit conveniently in most motor vehicles.

An apparatus made according to this invention holds a given box of tissue snugly to the roof of a motor vehicle directly above and immediately to the rear of the windshield. The tissue dispenser is thus readily available, and yet, it remains up and out-of-the-way.

It is an object of this invention to provide a simple tissue dispenser for motor vehicles which will have a convenient location, which can be easily refilled and installed, and which can be easily and inexpensively manufactured.

Other objects and advantages of this invention will be apparent during the course of the following description.

Figure 1:
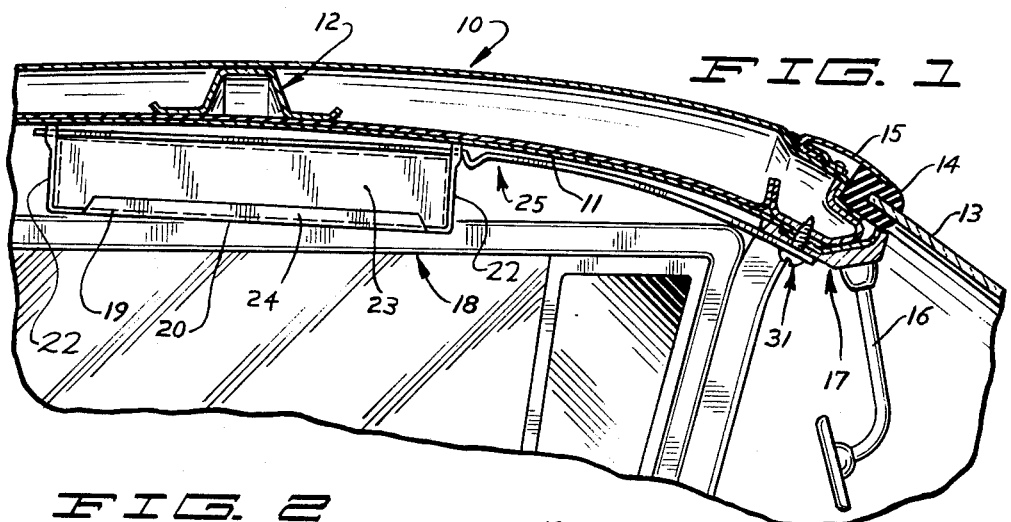
FIG. 1 is a fragmentary sectional view of the upper front portion of an automobile showing a tissue dispenser made according to the present invention.
Figure 2:
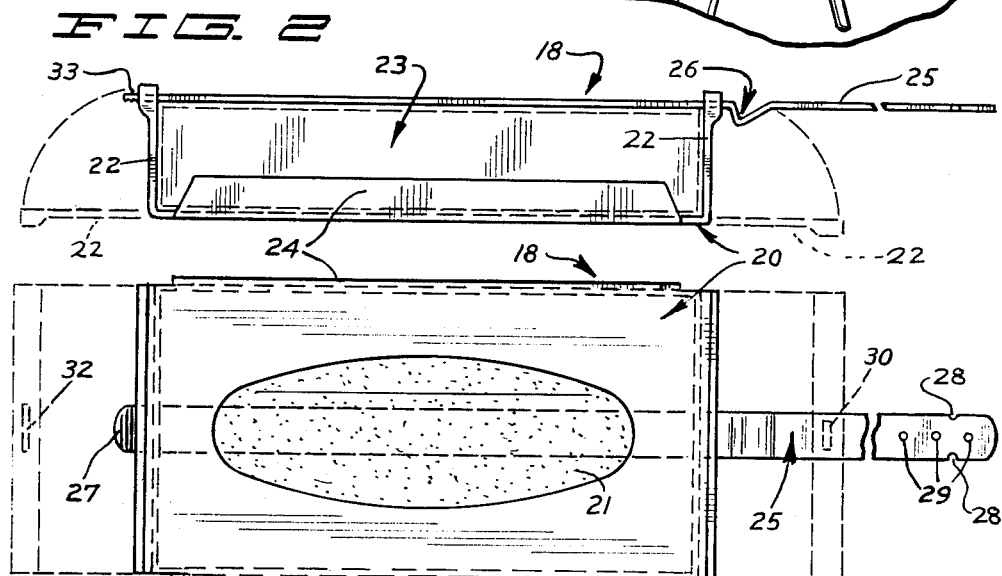
FIG. 2 is an enlarged side elevational view of the tissue dispenser shown in FIG. 1, before it is positioned in an automobile.
Figure 3:
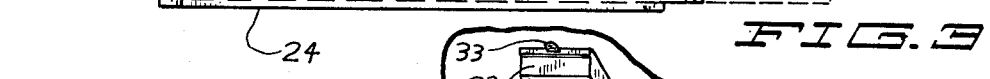
FIG. 3 is a bottom plan view of the tissue dispenser.

Referring to FIGS. 1–3 and the numerals of reference thereon, an automobile includes a roof 10 and a ceiling 11, which are supported by a frame cross-member 12. A windshield 13 fits into a windshield sealing strip 14 which is held in position by a molding 15. The rear view mirror 16 is mounted in a conventional manner at the top of the windshield and it is fastened over a garnish molding 17.

A tissue dispenser illustrated generally at 18 is mounted adjacent the roof of the automobile and includes a frame 19 that is designed to hold a conventional tissue box 23.

The frame 19 includes a bottom panel 20 having an oval shaped opening 21 in center thereof; a pair of end panels 22, 22 which as shown are extensions of and integral with the bottom panel and are adapted to fold up around a box of tissues 23; and a pair of side flanges 24, 24 one on each side of the tissue box. The frame material may be any material within the choice of the person skilled in the art, for example, polypropylene.

The dispenser 18, also includes a mounting bracket 25, which holds the tissue box in the frame, and at the same time, holds the whole assembly snugly against the ceiling of the automobile or other motor vehicle. The bracket 25 can be made of any desired material with spring properties, for example, a steel or plastic. The bracket 25 is provided with a crimped portion 26, in the center portion thereof. Several small holes 29 and notches 28 are provided at the front end of the bracket for mounting purposes.

Typically, the tissue box is placed top down on the bottom panel 20 of the frame 19 so the provided opening 21 in the tissue box frame and the provided opening in the tissue box, through which the tissues are normally dispensed, are in alignment. The end panels 22, 22 are then folded up against the ends of the tissue box. The bracket 25 is then inserted through a slot 30 in a first end panel of frame 19. The slot 30 is located such that when the end panel is folded up against the tissue box, the lower edge of the slot is substantially in the plane of the bottom panel of the tissue box. The bracket is then extended across the bottom panel of the tissue box, as shown in FIG. 2, and through a slot 32 provided in the second end panel 22, the said slot 32 being in the same plane as slot 30 in the first end panel of frame 19. The bracket is extended through the slots until the crimp 26 engages the front or first end panel 22. An outer end portion 33 of bracket 25 extends beyond the rear end panel 22 of frame 18. This outer end portion 33 has a plurality of shallow grooves 27 defined in the upper surface thereof to improve the friction between the bracket and the surfaces of slot 32 and help to retain the end panel in the proper position on the bracket.

As shown in FIG. 1, the bracket 25 can be held in place by removing a molding screw 31, which would usually hold the rear view mirror 16 in place; inserting the screw through one of the provided holes 29; and replacing the screw. This will hold the bracket tightly against the curved roof of the motor vehicle.

Figure 4:
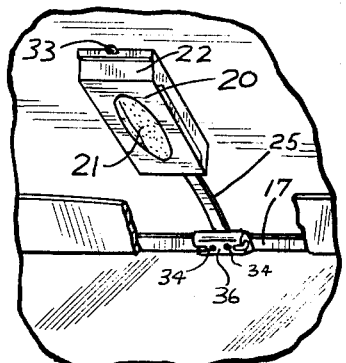
FIG. 4 is a fragmentary view of an alternate mounting of the tissue dispenser.

FIG. 4 shows an alternate method of mounting the bracket where the motor vehicle is equipped with a sunvisor attachment 36 which is used to hold the visor in place when it is positioned across the windshield. First, screws 34, 34 are removed. Second, the bracket 25 is inserted between the visor fixture 36 and the garnish molding 17 such that screws 34, 34 are aligned with the notches 28. Third, the visor fixture and bracket are clamped down tight to the garnish molding by tightening the screws.

Figure 5:
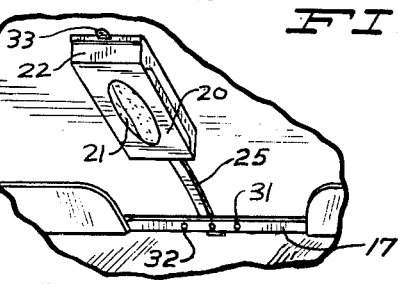
FIG. 5 is a fragmentary perspective view of a third mounting for the invention.

FIG. 5 shows a method of mounting when the rear view mirror is mounted on the dash rather than at the top of the windshield. In this case, the two screws 31 and 32 holding the garnish molding are loosened and the bracket 25 is inserted between the molding and the ceiling. The screws are then tightened down which results in the bracket becoming securely held in position.

Once the bracket has been mounted it can be sprung downwardly from the ceiling of the motor vehicle to permit installation of the frame and tissue box.

FIG. 1 shows how the bracket 25 bends to fit the contour of the ceiling 11, and since the bracket was originally straight, forcing it to bend to the contour of the ceiling causes its spring properties to clamp the whole assembly tightly to the ceiling of the motor vehicle.

To replace an empty tissue box when the assembly is mounted, a person need merely pull down the rear end panel 22, slide out the used tissue box, slide in a new box, fold the end panel up, and reinsert the bracket 25 through slot 32 in the end panel. The rear end panel folds down to permit insertion of tissues without removing the entire frame 19 from bracket 25. The fold at the front end panel permits the rear portion of the frame to be dropped down to simplify insertion of the tissue box without sliding the frame off the bracket.

It must now be clear that the invention achieves all of its intended objects and purposes. What is achieved is a device very simple in nature, yet, a device with desirable features. It fits nicely into a portion of a car or other similar motor vehicle which has no other apparent functional use. The dispenser is within easy reach. It would no longer be necessary to go into the glove compartment or behind the visor for tissues. Furthermore, this dispenser will hold a large box of tissues; but, when it does become necessary to replace an empty tissue box, it is readily apparent that this dispenser can be refilled both quickly and easily.

What is claimed is:

1. A dispenser for tissues packaged within an outer box, said dispenser including a mounting bracket adapted to be mounted adjacent the roof portion of an automobile, and a frame for holding said tissue box, said frame including a main panel adapted to be placed over the normal top of said tissue box, said main panel having an opening defined therethrough, first and second frame and panels mounted to said main panel and adapted to overlie the end panels of said tissue box, said end panels of said frame extending outwardly beyond the back panel of said tissue box, each of said end panels having a slot defined therethrough and being of size to receive said mounting bracket, said slots being positioned so said mounting bracket is substantially contiguous to the back panel of said tissue box when said bracket is positioned within both said slots.

2. The combination as specified in claim 1 and stop means on said bracket from preventing said first end panel from sliding onto said bracket beyond a predetermined point.

3. The combination as specified in claim 2 wherein the outer end portion of said bracket has plurality of transverse grooves defined therein and being positioned to engage the surfaces defining said slot in said second frame end panel to enhance the frictional hold between said bracket and the second frame end panel.

4. The combination as specified in claim 1 wherein said frame end panels are integral with said main panel and are adapted to be folded upwardly to position contiguous to opposite ends of said tissue box.

5. The combination as specified in claim 1 wherein said bracket is a substantially flat strap of a resilient material and has means thereon for fastening it adjacent top portions of a windshield of an automobile, said flat strap being of sufficient resilience to conform to the curved top of the automobile.

6. A dispenser for tissues or the like including a mounting bracket adapted to be mounted adjacent the roof portion of an automobile, and a frame for supporting a plurality of tissues, said frame including a main panel adapted to be placed over the front of the tissues, said main panel having an opening defined therethrough which is of size to permit removal of tissues therethrough, first and second frame end panels hingedly mounted on said main panel and extend at substantially right angles thereto and adapted to overlie the ends of the tissues on the main panel, said end panels of said frame extending outwardly beyond the opposite surface of the tissues from the surface facing the main panel, each of said end panels having a slot defined therethrough and being of size to receive said mounting bracket, said slot being positioned so said mounting bracket acts to overlie tissues in said frame when said bracket extends through both said slots, the outer end portion of one end of said bracket protruding a short distance beyond the slot of the end panel farthest from the point of attachment of said mounting bracket to the roof portion of an automobile.

References Cited by the Examiner
UNITED STATES PATENTS 2,564,997   8/51   Rome _____ 248—311

RAPHAEL M. LUPO, *Primary Examiner.*